United States Patent [19]

Bolte et al.

[11] Patent Number: 4,896,788
[45] Date of Patent: Jan. 30, 1990

[54] PACKAGING MEANS HAVING TAB SEALING MEANS ATTACHED WITH SOLVENT-FREE HOT MELT ADHESIVE, HOT MELT ADHESIVE THEREFOR AND METHOD OF ADHESIVE BONDING USING SAID ADHESIVE

[75] Inventors: Georg Bolte, Vechelde; Dieter Heinecke; Gunter Hexel, both of Braunschweig; Rudolf Hinterwaldner, Moosach-Altenburg, all of Fed. Rep. of Germany

[73] Assignee: 501 Schmalbach Lubeca AG, Fed. Rep. of Germany

[21] Appl. No.: 173,645

[22] Filed: Mar. 25, 1988

[30] Foreign Application Priority Data

Mar. 27, 1987 [DE] Fed. Rep. of Germany ....... 3710157

[51] Int. Cl.$^4$ .................. B65D 17/50; B65D 41/02
[52] U.S. Cl. ............................ 220/359; 229/3.5 MF; 525/418; 525/425; 525/432
[58] Field of Search ............ 525/418, 425, 432; 206/60; 220/359, 125.33, 125.35, 220; 229/123.2, 3.5 MF

[56] References Cited

FOREIGN PATENT DOCUMENTS

| 65417 | 5/1982 | European Pat. Off. . |
| 0078625 | 10/1982 | European Pat. Off. . |
| 786625 | 10/1982 | European Pat. Off. . |
| 3115954 | 1/1982 | Fed. Rep. of Germany . |
| 3115964 | 1/1982 | Fed. Rep. of Germany . |
| 417376 | 8/1962 | Switzerland . |

OTHER PUBLICATIONS

Skeist, "Handbook of Adhesives," Van Nostrand Reinhold Co., N.Y.C., 1962, pp. 447, 450.
Official Action dated 8/26/87 issued in connection with German priority application (with translation).

Primary Examiner—Allan M. Lieberman
Attorney, Agent, or Firm—James W. Hellwege

[57] ABSTRACT

A packaging means adapted to be filled with a liquid or solid fill material having an opening in a wall thereof sealed by a removable sealing means, the sealing means being attached to the wall of the packaging means in a manner effective to seal the opening by means of a solvent-free thermoplastic hot melt adhesive. A novel thermoplastic hot melt adhesive and a melt of use thereof to attach the sealing means are also provided.

14 Claims, 1 Drawing Sheet

PACKAGING MEANS HAVING TAB SEALING MEANS ATTACHED WITH SOLVENT-FREE HOT MELT ADHESIVE, HOT MELT ADHESIVE THEREFOR AND METHOD OF ADHESIVE BONDING USING SAID ADHESIVE

BACKGROUND OF THE PRESENT INVENTION

The present invention is directed to packaging means with an attached tab means held in place by temperature resistant adhesive bonding, in particular a tear-off tab on a portion of the wall of a container. The adhesive is temperature resistant; i.e., the adhesive bond between the tab means and the packaging means is resistant to the effects of sterilization temperatures (130 to 150 ° C) as well as low temperatures (−40° C). The present invention is also directed to a process integrated into the production sequence for the adhesive bonding of one or several tabs to a package. Tabs, in particular those for the tearing open of metal containers, such as, for example, beverage cans, cans of different size for food items or the like, are fastened according to the state of the art by means of rivets, for example tubular rivets, to a part of the wall of a hollow body. The disadvantage of this mode of attaching the tabs is that it involves a relatively expensive production method, which is accomplished primarily by a plurality of complex stamping tools. The extreme substrate deformation associated with it frequently requires additional recoating and sealing of the rivet locations. To eliminate the disadvantages relating to the mechanical fastening of tabs, attempts have been made to attach the tabs to the packaging means by adhesive bonding, as described in European patent application 0 065 417 and European patent application 0 078 625. Particularly in European patent application 0 078 625, easily opened lids for containers are described, wherein the tab is bonded to the area to be opened by means of a connecting pivot point in the form of a thermoplastic resin adhesive layer which consists of a copolymer or a polyamide. Exemplary copolymers include copolyesters, copolymers of vinyl ester, ionomers and the like. In order to obtain adequate adhesion at the boundary surfaces at the bonding locations, the metal surfaces must be pretreated and provided with an adhesive primer. The pretreatment of the surface and the provision of adhesive primers are expensive and time consuming. In particular, if the adhesive primer must be dried or possibly burned in, then substrate deformations may result. A further disadvantage arises in the case of adhesion primers which contain solvents which require eternally protected coating equipment and may result in environmental problems. If the primer is applied coil to coil, long and expensive drying tunnels are required to make them economically feasible. An essential disadvantage relates to the backbone polymers of the aforedescribed melt adhesives. Because of this —— in spite of surface pretreatments and adhesive primers —— high temperature resistant adhesive bonds cannot be produced. Furthermore, it is not possible to satisfy the aforementioned requirements with the melt adhesives described above.

For example, copolymers of ethylene with vinyl esters, for example vinyl acetate, acrylic acid ester and the like, soften at temperatures between 60° and 90° C. and, due to the relatively low softening point, begin to creep.

Polyamides based on fatty acids, for example dilinolic acid and hexamethylene, have in the case of low or intermediate molecular weights, in spite of their good wetting properties—due to their relatively low crystal melting points—only a limited heat resistance, which affects the adhesive bond produced while in storage. In the case of the higher molecular weights, due to the higher melting points, provide higher strengths at elevated temperatures but are very difficult to process, as application temperatures of at least about +240° C. are required and they may be used only with a limited number of substrates.

Copolyamides of monomers, such as for example, caprolactam AH salt, adipinic acid esters of the hexamethylenediamine of 11-aminoundecanic acid, lauric lactam, exhibit high melt viscosity values and are therefore used in the powder form only. However, they have inadequate flexibility.

Copolyesters, such as for example tere- and isophthalic acid esters of glycols. for example 1,6-hexanediol, (a) yield in the case of low viscosities ($n \leq 0.4$) adhesive layers which adhere poorly and break easily, (b) require in the case of medium viscosities ($0.4 \leq n \leq 0.85$) very high processing temperatures (+250° C. or higher) and their adhesive layers are not resistant to hydrolysis, and (c) they melt with difficulty at high viscosities ($n = 0.9$ or higher) and wet the adhesive surface poorly.

Furthermore, the heat sensitivity of these backbone polymers, particularly in the case of polyamides, is a critical factor and their so-called "heat history" is very difficult to handle. The adhesive bonds so prepared between identical and different substrates deteriorate significantly, for example, during sterilization at 130° C./60 min.

Packaging means are defined in the context of the present invention as containers, cartons, boxes, cans and the like, used for the packaging of food and condiments, pharmaceuticals, cosmetics, technical products, beverages, mineral oils, solvents, and water. A particular area relates to the hollow bodies encountered in the marketplace, in particular, cylindrical cans and containers for liquids, such as beverages, oils, but also of goods to be maintained fresh, such as, for example, meat and sausage wares, prepared meals, nuts and the like, preferably of tin plate and aluminum.

The packaging means may be made of different substrates and substrate combinations. These include metals, for example steel and aluminum sheets and foils, which may be laminated with plastic and/or cellulose substrates and/or coated. Plastics, in particular, thermoplastics, such as polyethylene, polypropylene, polyvinylchloride, polyvinyledene chloride, ethylene-vinylester copolymers, polyvinyl alcohols, are also suitable and may be used by themselves or as composite substrates with metal and/or cellulose substrates. Finally, packaging means comprised of cellulose materials, such as paper, cardboard or the like, are appropriate. They may be employed alone or in combination with metal and/or plastic substrates, or provided with a lacquer and/or wax layer.

Tabs as defined herein include functional parts or handles for packaging means, fixedly attached to the packaging containers and serving to render the opening of the package, in particular containers, easier, as well as providing transportation and/or suspension functions. It is assumed that the packaging means or the locations, for example, lids, to which the tabs are attached to the packaging means, are configured, for example, by reductions in cross section (notching) in a manner such that the packaging means may be torn open with the tab. As an example of such containers, Swiss Pat. No. 417 376 is cited. The tabs may be made of the same substrate as the packaging means. They are often reinforced by the inclusion and/or embedding of reinforcing materials, such as fibers, so as not to be damaged or destroyed by one of the above-mentioned functions.

In order to be able to perform one of the above functions, in particular the tearing open function, it is necessary to render the bond between the packaging means and the tab strong enough so as not to be weakened or destroyed by the application of force. This requirement could be satisfied by a riveted joint only. The adhesive bond described in European patent application No. 0 078 625 between the packaging means and the tab established with standard backbone polymers performs this function in part only if the adhesive surface is pretreated and provided with an adhesive primer. In case of increased temperatures, such as in the case of prepared meals, the force required for the tearing intended to act through the tab on the predetermined fracture location, leads to fracture or shearing off at the adhesive bonding surface. Similar processes occur during the application of force at low temperatures, during transport and/or upon the hanging of a packaging means.

The heat resistant adhesive bond between the packaging means and the tab must have an adhesive strength such that during the application of force in the tensile, tensile-shear and/or peeling mode at different temperatures the adhesive strength must be greater than the force required for the breaking or tearing of the packaging means. Only then is a tab an acceptable operating part of a packaging means, in particular a container.

OBJECTS AND SUMMARY OF THE INVENTION

It is accordingly an object of the present invention to provide a packaging means with a tab that is simple to produce and exhibits desirable resistance to high and low temperatures in order to be able to perform the functions of tearing, transport and suspension.

A further object of the present invention is to provide an adhesive suitable for the attainment of the above.

Finally, it is yet another object of the present invention to provide a specific method for the adhesive bonding of the tab to the packaging means using the adhesive of the present invention.

The object of the invention thus relates to the establishment of a temperature resistant adhesive bond beween the tab and the packaging means, in particular the bonding of tear-off tabs to a portion of the wall of a container, with a solvent-free thermoplastic hot melt adhesive comprised of one or several backbone polymers with equal and/or different amounts of segments of amide, imide, ester and/or ether blocks of the general formula

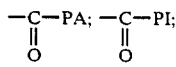

wherein A is selected from

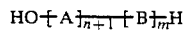

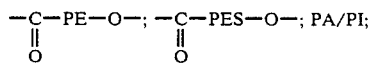

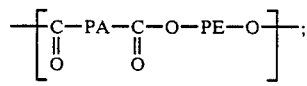

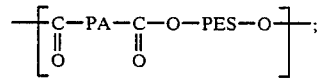

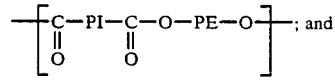

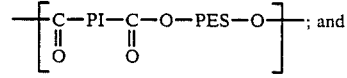

wherein B is selected from PA, PI, PE, PES and/or a block segment of A, with the proviso that one of A or B contains segments of PA or PI while the other contains segments of PE or PES, n=an integer of 0 to 50, m=an integer of 0 to 50, the ratio of PA and/or PI to PE and/or PES in the block segments may range from 1:10 and 10:1 and the ratio A:B ranges from 1:20 and 20:1, wherein PA=polyamide/copolyamide, PA/PI=-copolyamide imide, PI=polyimide, PE=polyether and PES=polyester/copolyester blocks. The hot melt adhesive may additionally contain various conventional additives such as adhesion-improving additives, colorants, pigments, fillers, antioxidants, heat stabilizers and mixtures thereof.

DETAILED DESCRIPTION OF THE INVENTION

Figure 1:
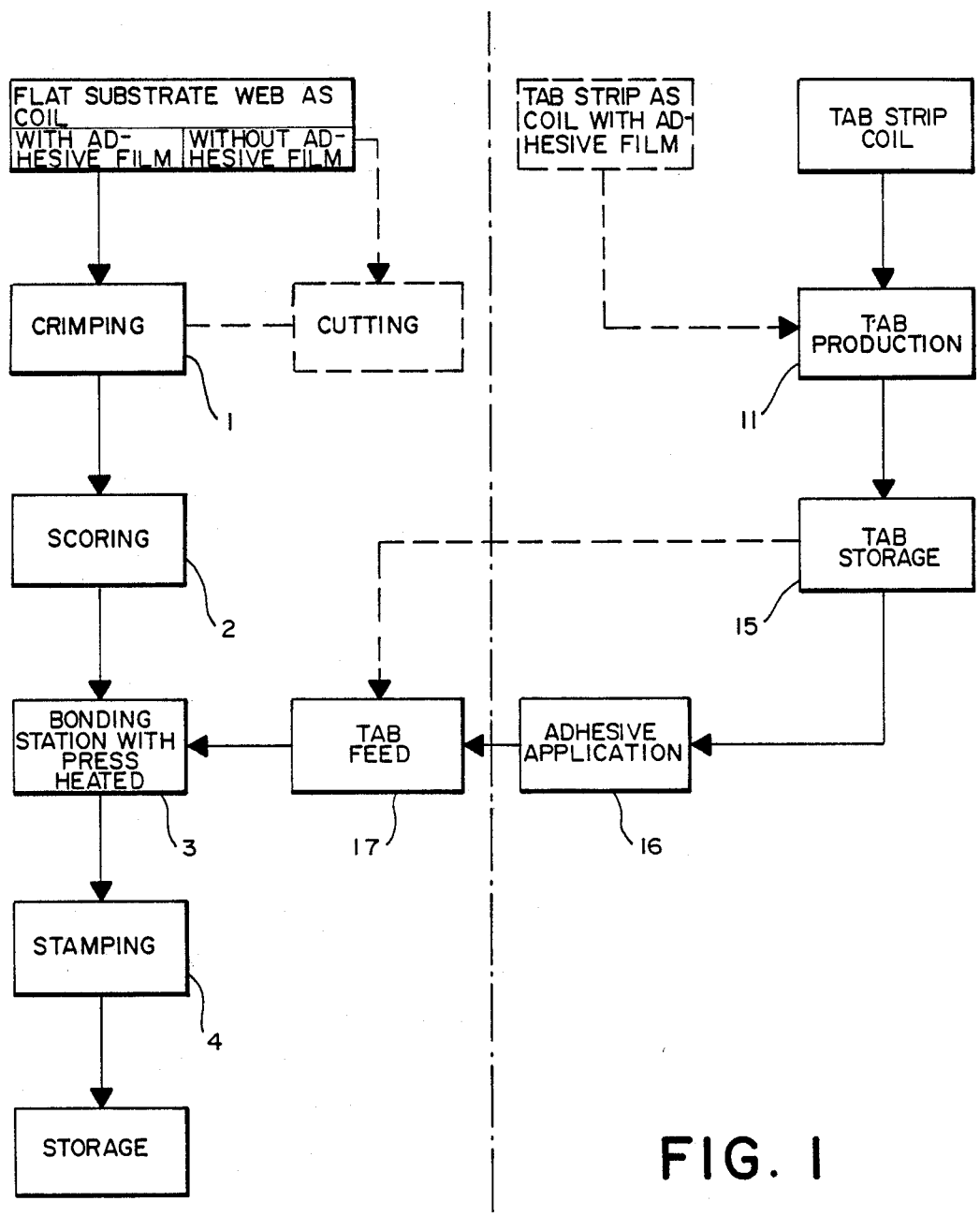
FIG. 1 comprises a schematic diagram of a production process undertaken in accordance with the present invention.

The backbone polymers according to the present invention may comprise, for example, block copolymers or segment copolymers of: block copolyetheramides, block copolyesteramides, block copolyetheresteramides, block copolyetherimides, block copolyesterimides, and block copolyetheresterimides.

The block copolyether, block copolyetherester and block copolyesteramides are polycondensation or copolycondensation products of block polyamides or block copolyamides with reactive terminal groups and block copolyesters or block copolyesters with reactive terminal groups, such as, among others, block polyamide or block copolyamide-α, β-dicarboxylic acids, with either a block ether diol or block polyetherdiamine at the end of the chain; and block poly- or block copolyamidediamine, with block polyether at the end of the chain, which additionally is carboxylated.

Particularly suitable backbone polymers for the temperature resistant hot melt adhesives for the tab/packaging means joints according to the present invention include block poly- and/or block copolyetheresteramides of polyamide 6, 11 or 12 and copolyamides 6, 11 or 12 with polyoxypropylene glycol and polyoxytetramethylene glycol.

The block copolyester and block copolyetherimides and polyamidimides are obtained, for example, by polycondensation or copolycondensation from diaminodiphenylethers; diisocyanates, such as, for example, diphenylmethanediisocyanate with dicarboxylic acid components, such as, for example, pyromellithic acid dianhydride, trimellithic acid anhydride, which then are provided with reactive terminal groups, as in the case of block copolyetheramides, and finally through poly- or copolycondensation with block polyesters, block copolyesters and block polyethers with reactive terminal groups.

For high temperature resistant adhesive bonds between the tab and the packaging means block copolyester, block copolyetherimide and/or polyamidimides, particularly those with maleic imide segments, are preferred.

Especially preferred backbone polymers for use in the temperature resistant adhesive layer between a tab and the packaging means include (a) a block copolyetheramide comprised of 15 to 95% by weight of a polyamide and up to 85% by weight of a polyester and/or (b) a block copolyetheramideimide comprised of 15 to 95% by weight of a polyamide and polyimide, in particular maleic imide, and 5 to 85% by weight of a polyester, obtained by the polycondensation of block copolyamides or block copolyamidimides with terminal reactive groups and block copolyesters with terminal reactive groups.

These novel backbone polymers have melting and softening points between 100° and 350° C., preferably between 120° to 250° C., in particular between 130° and 220° C. The glass transition temperatures are no greater than +20° C. different.

Melt and processing viscosities may vary within wide limits and are essentially codetermined by the processing temperature. Viscosities are generally, for example, between 10 to 5,000 Pa.s/200° C., in particular 80 and 1,500 Pa.s/200° C. The block copolymers containing polyimide blocks possess viscosities of between 50 to 2,000 mPa.s/250° C.

In contrast to standard polyamides and copolyamides, the novel backbone polymers of block copolymers may be processed in a noninert atmosphere. For the food and pharmaceutical fields, melt adhesives may be produced and processed, which are free of additives, antioxidants and heat stabilizers, since the antioxidants and heat stabilizers preferably involve sterically hindered phenol compounds, such as for example 2,6-ditert. butyl-4-methylphenol, which are not without physiological risks.

The proportions of the polymer blocks and segments employed may be varied to modify the mechanical, chemical, thermal and adhesive properties of the block copolymers in order to obtain tailor-made backbone polymers for the hot melt adhesives. Such parameters may be modified as follows:

(a) The polyether blocks control hydrophilic and antistatic properties and flexibility;
(b) The polyester blocks control in addition to (a) above the adhesion to substrate surfaces;
(c) The polyamide blocks control the melting and softening point of the copolymers, temperature resistance, the density and the chemical stability; and
(d) The polyimide blocks control the long term and high temperature stability of block copolymers.

Additional modifying parameters include the chain length of the polyamide block which affects the melting point, the weight ratios of the A:B blocks and that of the block segments within A and B which affect hardness as well as the polyether block content which determines the elastomeric character of the backbone polymers.

Depending on the final properties desired for the adhesive polymer, the weight ratios of the blocks A:B may range between 1:20 and 20:1, wherein "n" and "m" are integers of from 0 to 50. With regard to the individual block segments in A and B, the weight ratios may be within the range of PA/PI:PE/PES of 1:10 to 10:1.

Compared with standard polymers as described in European patent application No. 0 078 625, the afore-described backbone polymers in their role as adhesives and in the adhesive layer of the tab/packaging means joint according to the present invention, offer the following advantages:

(a) improved rheological properties in processing, i.e., lower viscosity values;
(b) less creeping during setting and storage;
(c) high temperture stability at sterilization temperatures as well as at low temperatures;
(d) good adhesive properties on numerous substrate surfaces without pretreatment of the surfaces and without an adhesive primer; and
(e) desirable toughness and elastic properties of the adhesive layer.

The above advantages can be obtained without preprocessing of the surface and without adhesive primer.

Exemplary materials or substrates which may be bonded by means of the afore-described backbone polymers include but are not limited to metals, such as steel, tin plate, aluminum; plastics such as polyethylene, polypropylene, polyvinyl chloride, polycarbonate, 2-polymethylpentene thermoplastics, and the like; and cellulose materials, such as for example, paper, coated paper, cardboard, corrugated cardboard, or the like.

The afore-described backbone polymers may be used separately or in a modified form. While with the standard polymers polyamides, copolyamides, polyesters and copolyesters a series of compatibility problems may arise in connection with the use of modifiers, such as other copolymers, adhesive resins, waxes or the like, the novel backbone polymers do not exhibit such negative properties. They are compatible with ethylene-vinylacetate copolymers, various adhesive resins, such as colophony resin esters, terpenephenol resins, aromatic and aliphatic hydrocarbon resins and waxes, such as polyethylene wax.

Especially advantageous for the modification of the novel backbone polymers of the present invention are graft and/or segmented standard polymers and/or copolymers. For example, graft polyolefins, such as for example, polyethylene or polypropylene grafted with polar groups are suitable. Graft copolymers of ethylene and butylene with vinyl esters, such as, for example, vinyl acetate or vinyl acrylate; and thermoplastic rubbers such as styrene-butadiene-styrene block copolymers are also suitable for this purpose. The polar groups may include among others ethylenically unsaturated compounds, such as acryl and methacrylic acids and their esters, maleic acid and its esters, silane acrylate and monostyrene. The segmented copolymers preferably involve copolymers of ethylene with vinyl esters, such as vinyl acetate, which may include segments of acryl and/or methacryl groups. By the grafting of polar groups onto base polymers, adhesive properties may be improved and they may serve simultaneously as "phase intermediates" in the adhesive bonding of polar and nonpolar materials. The amount of grafting will generally range from between 1 to 50%, preferably between 1 to 25%, and most preferably between 1 to 15%, based on weight. In addition to these technical advantages, they also contribute to the reduction of the raw material costs of the novel melt adhesives for tab/packaging means bonds.

To increase the adhesion to boundary surfaces, in addition to adhesive resins, so-called adhesion promoters, such as silanes, may also be used. These are particularly useful with regard to the use of metal and nonpolar plastic substrates and improve adhesive properties at high and low temperatures on boundary surfaces.

Colorants, pigments, fillers and if necessary antioxidants and heat stabilizers may also be added to the melt adhesives of the present invention.

The novel hot melt adhesives may be provided in sheet form in order to simplify and enhance the application of the adhesive in mass production.

With these novel backbone polymers hot melt adhesives may be prepared which, relative to their tensile, tensile shear and peeling strengths, are superior to those based on conventional polymers and which also have improved high and low temperature stablity. Furthermore, they may also be processed at lower temperatures in view of their enhanced rheological properties.

Although the backbone block copolymers of the present invention develop good adhesion even on nonpolar substrates, the adhesion may be increased further by addition of graft polyolefins and/or copolymers. This increased adhesion is especially effective on the boundary surface of the nonpolar substrate surface if the identity of the release agents and lubricants used in the production of the substrate is not known, as these release agents and lubricants have characteristic adhesive properties. These problems appear in particular with substrates comprised of thermoplastic polyolefins, such as polyethylene and polypropylene. If one or several of the backbone polymers of the present invention are modified with one or several graft polymers or copolymers, the adhesion values at the nonpolar boundary surface may be increased by 1.1 to 2 times.

Thus, for example, to modify polyolefin/metal joints, graft polyethylene with a graft content of 5 to 15%, in particular 10 to 15%, based on acrylic acid and/or methacrylic acid or one of their alkyl esters, is suitable. In the case of the adhesive bonding of paper, for example kraft paper, to a nonpolar substrate such as polypropylene, preferably grafted, atactic polypropylene with a graft content between 1 to 10% acrylic acid and 1 to 10% monostyrene is appropriate. However, the adhesive bonding between metal and cellulose substrates may also be modified with advantage since a minor amount of graft acrylic and/or methacrylic acid enhances the adhesion on the metal surface.

A further object of the present invention is to provide a simplified and economic process for the preparation of an adhesive bond between a tab and a packaging means of equal or different substrates. In order to attain this object relative to the known disadvantages of Swiss patent No. 417 376, European patent application No. 0 065 417 and European patent application No. 0 078 625, the problem is defined as the development of a process wherein the following critical and expensive process parameters are eliminated:

(1) extreme substrate deformation by rivet fastenings;

(2) poor discharge of the fill goods, because the packaging means or container opening is scored in the center;

(3) no surface pretreatment of metal substrate surfaces, such as with phosphoric or chromic acid in the case of aluminum;

(4) no treatment of the preprocessed surface with solvent containing adhesive primers, which requires expensive coating, drying and hardening installations, and (5) the use of inert atmospheres during melting. in particular with polyamides and copolyamides.

The above objects may be attained according to the present invention by means of a temperature resistant adhesive layer between the tab and the packaging means of a hot melt adhesive according to the present invention. The preparation of a temperature resistant adhesive layer between the tab and the packaging means employing the adhesive of the present invention may be accomplished by the following exemplary procedures:

PROCEDURE 1

The hot melt adhesive is premelted in a conventional melting apparatus and further heated to the processing temperature shortly prior to application. The adhesive is applied to the bonding surface by means of a nozzle or a spray head which may be augmented by a metering device, optionally program controlled by a microprocessor.

The tab and/or packaging means is pressed onto the adhesive layer.

The adhesive layer is permitted to cool, at which time it is fully functional and serves to adhere the tab to the package.

PROCEDURE 2

The adhesive surface of the tab is coated with the hot melt adhesive and may be placed adjacent the adhesive layer.

To establish the tab/packaging means bond, the tab provided with the adhesive is positioned on the packaging means and heat applied to the adhesive layer at least on the boundary surfaces between the adhesive and the substrate surface so that the latter is adequately wetted and the desired bond obtained by applied pressure.

The adhesive layer is permitted to cool after which it is fully functional.

PROCEDURE 3

The packaging means substrate is provided with a hot melt adhesive coating which provides additional protection against corrosion, abrasion and the like.

The tab is placed onto the packaging means substrate and bonded to the substrate surface by means of the application of heat and contact pressure.

The application of hot melt adhesives to webs of flat substrates may be effected in conventional coating installations and by extrusion from the melt from coil to coil. If, on the other hand, a solid adhesive film of the melt adhesive is already present, it may be laminated to the flat substrate by application of heat.

A schematic view of the simplified production process according to the invention is shown in FIG. 1.

FIG. 1 shows three process paths, whereby the hot melt adhesives may be applied and integrated into the production lines. The production of packaging means and containers on the one hand and of the tabs on the other is undertaken in separate production units. It is immaterial in connection with the production process whether flat substrate webs provided with the adhesive or not, are employed.

Production of Lids

The flat substrate (sheet metal) is supplied in the form of sheets or rolls to the crimping station 1. Here the lid is shaped. In the subsequent scoring station 2 the thickness of the substrate is reduced in a defined area, preferably within the area of a closed circumferential line to a possible residual thickness (cross section weakening). Over the scoring or weakening, the opening point of the packaging means is marked at a predetermined location, so that the lid may be broken and torn open at this point. This is followed by the adhesive Station 3. In the case of adhesive surfaces provided with a hot melt adhesive, thermal activation and the pressing on the tab takes place here. If the bonding surfaces are not equipped in this manner, the accurately defined amount of the hot melt adhesive is applied and the surfaces pressed together. In both cases it is advantageous to heat the pressure die. In order to insure rapid cycle times, it was found that a difference in temperature between the two heated pressure dies of 150° C. or less, in particular 100° C. or less, is especially advantageous. To complete the operation, the finished lid is stamped out of the flat substrate web at Station 4 and stored in Station 5.

Tab Production

The flat substrate web, which preferably consists of a sheet metal roll, is fed to the automatic tab making machine 11, wherein the tab is shaped in several working steps. The tab is then stored at 15. If the bonding surface has not been provided with the adhesive, an adhesive metering device 16 is provided in the production line. The tab equipped with the adhesive is transported to the sheet metal immobilized at 17 and bonded at 3 to the surface at the intended location on the lid with the application of heat and pressure.

Although the packaging means to be provided with a tab by means of an adhesive bond is preferably comprised of metal, in particular tin plate or aluminum, the invention may also be carried out with other materials, such as plastics, cellulose materials and the like. Since the packaging materials often are comprised of composites, for example aluminum together with polyethylene or polypropylene, composite foils of different thermoplastic materials, such as polyethylene/polyvinyl chloride/polypropylene, cellulose materials, such as satinized paper with aluminum and/or thermoplastics, the process conditions must be adjusted to the properties of the substrates employed. However, in order to obtain an optimal adhesive bond between the tab and the packaging means, it has been discovered that a substrate surface not previously coated and wetted by the melt adhesive should be preheated. The preheating temperature is a function of the type of substrate employed. The preheating temperatures are in the case of metal substrates at least 100° C., in particular 10° C. in excess of the melting and softening points of the hot melt adhesives, in the case of plastics (thermoplastics) at least 10° C. under the softening point of the substrate and in the case of cellulose materials at least about 80° C.

The preheating and the thermal activation of an adhesive layer applied to the bonding surface may be effected by application of thermal energy derived from electric power steam, infrared radiation, flames, high frequency energy and/or lasers. As in the case of nonpolar plastic surfaces a surface pretreatment by flaming may be necessary to improve the adhesive properties of the boundary surfaces, wth such treatment simultaneously serving to preheat the surface.

Although a preliminary treatment of the surface is not absolutely necessary when hot melt adhesives according to the present invention are used, it has been found that the bond properties may be improved in the case of nonpolar plastic surfaces by pretreating such surfaces with flame treatment or corona discharge. Flame treatment of nonpolar plastic surfaces not only renders the bonding surface more capable of adhesion, but simultaneously, as mentioned above, the quenching of the liquid melt adhesive upon contact with a cool bonding surface is prevented. Surprisingly, the application temperature of the hot melt adhesive can thereby be lowered and the cycle times of a production line shortened. The number of production cycles, both with regard to the number of substrates and tabs provided with melt adhesives and the establishment of an adhesive bond between the tabs and the packaging means, comprise an important functional object of the present invention. In order to obtain the utmost economy, a very high production rate per unit time is desired. Hence, it is decisive that the hot melt adhesive have (1) a low melt viscosity at the lowest possible application temperature, (2) in addition to good wetting properties, an adequately high tackiness (adhesiveness) and initial adhesive strength, and (3) high adhesive properties over a wide temperature range.

The hot melt adhesive must not form threads during the hot application, as is the case of standard backbone polymers. Thread formation not only clogs the production equipment, but causes the interruption of the establishment of the adhesive bond, as neither the substrate nor the tabs can be fed to the bonding location. Production lines with their bonding stations are designed for an output of 10 to 1,000 bonded tabs/min.

The contact pressure at the bonding stations may be applied on both or on one side by means of dies. The pressure on one or on both sides depends on the type of packaging means and the configuration of the tab and the container. It is generally between 0.1 and 15 bar as a function of cycle times.

The bonding process forming a temperature resistant adhesive layer between the tab and the packaging means with one of the melt adhesives yields the following technical and economic advantages:

(1) No substrate deformation whereby the scoring for the opening of the packaging means may be located close to the core/level radius. By means of this novel positioning and layout of the opening and the tab attached, an improved and easier emptying of the fill material is obtained.
(2) The use of thinner and/or harder packaging means substrates.
(3) No post-processing, hence there is no damage to finish coatings.
(4) Simplified tab fastening tools.

In the food, beverage and pharmaceutical industries, but also in other technical fields, the temperature stability of packaging means and their adhesive bonds is of special importance, as they are exposed to high temperatures during heating. for example during sterilization of the fill material, and subsequently to low temperatures upon cold storage. Furthermore, there are packages which are exposed continuously to alternating thermal stresses at high and low temperatures. In the case of the bond between the tab/packaging means, it is further of great importance that the tab not be lost during handling, as this would obviously effect the ease by which the packaging means was opened. To provide additional simplification for the variety of adhesives required, the hot melt adhesives of the present invention offer a further advantage relative to the aforementioned disadvantages of the standard hot melt adhesives based on standard polymers. As the block polymers cover a wide range of temperature stability and in themselves are more resistant to temperature, they offer very good bonding performance both at high and low temperatures, for example at +130° C. and −40° C. Sterilizing conditions are often very different. Generally, they are around 130° C./60 min. If an adhesive layer has no inherent strength—due to softening—the tab may drop off during sterilization. Additional strength may also be lost if the adhesive is prone to creeping (cold flow) during cooling. For this reason, the adhesive layer must also tough in addition to its temperature resistance, i.e., among others, it must not become embrittled.

The following test procedures are employed to determine bond strength for the tab/packaging means bonds.

Adhesive strengths are determined in keeping with the DIN standards given below:
Tensile strength: DIN 53 288
Tensile shear strength: DIN 53 283
Peeling strength: DIN 53 282
Bonding surface: approx. 50 mm² of original tab/packaging means adhesive bond
Advance: 2 mm/min.
Definition of adhesive bond strength:
Prior to sterilization: After a storage of 24 hours of the adhesive bond at 20° C.
After sterilization: Testing immediately following sterilization at declining temperatures due to cooling
Four days after and sterilization: Cold storage at −10° C. and subsequent heating to room temperature
Sterilizing conditions: Sterilization was carried out both (a) in a water bath and (b) in a steam bathat +130°C./60 min.

EXAMPLES 1 to 3

For the preparation of the adhesivelY bonded test specimens a specific bonding apparatus was developed and constructed in order to test original tab and lid parts. The bonding apparatus consisted of an upper and a lower tool part, into which fitting part guide positions were integrated. The tab positioning means was located in the lower part. Following the application of the liquid hot melt adhesive to the adhesive surface of the tab (approx. 50 mm²), the lid was placed upon it, the tool closed with the predetermined contact pressure and the parts bonded to each other. The temperatures of the heated pressure dies were different. To demonstrate the improved functions provided by the hot melt adhesive of the invention relative to both adhesive strength and temperature resistance in comparison to standard polymers, adhesives A and B were selected for the comparison. Hot melt adhesives 1, 2 of the present invention and comparative adhesive B were applied at +200° C. and hot melt adhesive 3 of the present invention and comparative adhesive A applied at +220° to 230° C. The bonding surfaces of all of the specimens were not pretreated and also not degreased. Additional data is found in Table 1.

TABLE 1

| Example | Adhesive | Substrate Combinations | Tool Temperature Die 1 (Upper Part) °C. | Die 2 (Lower Part) °C. | Contact Pressure | Contact Time Seconds |
|---|---|---|---|---|---|---|
| 1 | 1 | Alu/Alu | 100 | 200 | 0.5 | 30 |
| | | Alu/PP | 100 | 200 | 0.4 | 10 |
| | | PP/PP | 80 | 170 | 0.2 | 3 |
| 2 | 2 | Alu/Alu | 115 | 204 | 0.5 | 10 |
| | | Alu/PP | 115 | 204 | 0.3 | 8 |
| | | PP/PP | 100 | 180 | 0.1 | 2 |
| 3 | 3 | Alu/Alu | 130 | 250 | 0.5 | 10 |
| | | Alu/PP | 115 | 250 | 0.1 | 2 |
| | | PP/PP | | not tested | | |
| Comparative Example A | A | Alu/Alu | 115 | 215 | 0.5 | 30 |
| | | Alu/PP | 115 | 215 | 0.3 | 10 |
| | | PP/PP | | not tested | | |
| Comparative Example B | B | Alu/Alu | 140 | 220 | 0.5 | 10 |
| | | Alu/PP | 120 | 220 | 0.3 | 5 |
| | | PP/PP | 100 | 200 | 0.1 | 2 |

The following test substrates were selected:
(a) aluminum tabs
(b) tabs of polypropylene-coated aluminum
(c) aluminum foil lids, 110–118μm
(d) lids of a polypropylene/A1/polypropylene composite laminate, 210–220 μm, wherein the A1 core material was 100–110 μm thick.

Adhesives Employed

| | Adhesives Employed |
|---|---|
| Adhesive 1: | Block copolyetheramide (PA-12/PTMG) Melting point: 145° C. melt viscosity/200° C.: 1200 Pa · s |
| Adhesive 2: | Block copolyetheresteramide (PA-11/PPG/PTMG) Melting point: 156° C. melt viscosity/200° C.: 3500 Pa · s |
| Adhesive 3: | Block copolyetheramideimide (PA-11/MA-PI/PPG/PTMG) Melting point: 190° C. melt viscosity/230° C.: 850 Pa · s |
| Comparative Adhesive A: | Copolyamide (PA 6,6/PA 6/12) Melting point: 142° C. melt viscosity/230° C.: 102 Pa · s |
| Comparative Adhesive B: | Tere- and isophthalic acid and butane diol copolymer Melting point 172° C. melt viscosity/200° C.: 293 Pa · s |

Notations Employed

| Notations Employed | |
|---|---|
| PA = | polyamide |
| CoPA = | copolyamide 6, 11 or 12 |
| MA-PI = | maleic imide |
| PG = | polyoxypropylene glycol |
| PTMG = | polyoxytetramethylene glycol |
| AL = | aluminum |
| PP = | polypropylene |
| PEG = | polyethylene glycol |

The results of the adhesive strength tests are compiled in Table 2.

TABLE 2

| | Adhesive | | | | | | | | | Comparative Adhesive | | | | | |
|---|---|---|---|---|---|---|---|---|---|---|---|---|---|---|---|
| | 1 | | | 2 | | | 3 | | | A | | | B | | |
| Substrate Combinations | Alu/Alu | Alu/PP | PP/PP | Alu/Alu | Alu/PP | PP/PP | Alu/Alu | Alu/PP | PP/PP | Alu/Alu | Alu/PP | PP/PP | Alu/Alu | Alu/PP | PP/PP |
| Tensile Strength | | | | | | | | | | | | | | | |
| before sterilization | 3.1 | 2.4 | 2.3 | 4.3 | 2.8 | 2.5 | 4.8 | 3.1 | — | 2.9 | 0.4 | — | 1.8 | 0.4 | 0.2 |
| after sterilization | 0.2 | 0.2 | 0.2 | 1.4 | 0.4 | 0.3 | 3.2 | 1.6 | — | 0 | 0 | — | 0 | 0 | 0 |
| 4 days after sterilization | 3.8 | 2.5 | 2.1 | 4.3 | 2.6 | 2.5 | 4.8 | 3.1 | — | 2.8 | 0.2 | — | 1.6 | 0.2 | 0.1 |
| Tensile Shear Strength | | | | | | | | | | | | | | | |
| before sterilization | 3.9 | 2.5 | 2.4 | 4.1 | 2.6 | 2.7 | 5.2 | 3.0 | — | 3.1 | 0.5 | — | 1.9 | 0.3 | 0.2 |
| after sterilization | 0.3 | 0.2 | 0.3 | 1.5 | 0.3 | 0.4 | 4.6 | 1.7 | — | 0 | 0 | — | 0 | 0 | 0 |
| 4 days after sterilization | 4.0 | 2.7 | 2.5 | 4.2 | 2.5 | 2.6 | 5.2 | 3.1 | — | 2.9 | 0.3 | — | 1.8 | 0.1 | 0 |
| Peeling Strength | | | | | | | | | | | | | | | |
| before sterilization | 6.8 | 3.2 | 2.9 | 7.4 | 3.5 | 3.1 | 7.2 | 4.2 | — | 3.7 | 0.9 | — | 0.4 | 0.2 | 0.1 |
| after sterilization | 0.5 | 0.2 | 0.3 | 3.9 | 0.5 | 0.5 | 5.8 | 2.0 | — | 0 | 0 | — | 0 | 0 | 0 |
| 4 days after sterilization | 6.9 | 3.1 | 3.0 | 7.3 | 3.4 | 3.2 | 7.1 | 4.1 | — | 4.1 | 0.7 | — | 0.1 | 0.1 | 0 |

EXAMPLE 4

To prepare an adhesive layer between an aluminum tab and an aluminum lid and an aluminum tab and a steel lid, a block copolyesteramide (CoPA 6,11/PEG/PPG) with a melting point of 138° C. and a melt viscosity of 180 Pa.s/200° C. was used and bonded in the manner described in Examples 1 to 3. In spite of the low melting point of the polymer, peeling strengths of 0.4 N/mm/120° C. were still obtained after sterilization. It amounted to 5.8 N/mm after the cooling of the adhesive layer.

EXAMPLE 5

The following hot melt adhesive mixture was prepared:
80 parts by weight block copolyetheramide (polymer of Example 2)
20 parts by weight graft polypropylene with a graft content of 1.5% by weight styrene and 3% by weight acrylic acid.

The melt adhesive had a melting point of 146° C. and a melt viscosity of 86 pa.s/200° C. Tabs of glass fiber-reinforced polypropylene were bonded to steel and aluminum lids coated with polypropylene. The temperatures of the pressure dies employed were 120° C. for the lower part and 140° C. for the upper part.

The melt adhesive was applied in the liquid state at a temperature of 180° C. The parts to be bonded were pressed together for 2 seconds at a pressure of 0.3 bar. After a storage time of 24 hours at room temperature, the peeling strength before and after sterilization was determined:
Peeling strength before sterilization: 3.2 N/mm
Peeling strength after sterilization: 0.4 N/mm

EXAMPLE 6

The following adhesive mixture was prepared:
70 parts by weight block copolyethercopolyamide (CoPA 6,12/PPG)
30 parts by weight colophony resin ester The hot melt adhesive had a melting point of 142° C. and a melt viscosity of 90 Pa.s/200° C. Aluminum tabs were bonded to steel substrates using contact temperatures of 150/200° C. The following peeling strength values were obtained:
Peeling strength before sterilization: 3.7 N/mm
Peeling strength after sterilization: 0.5 N/mm

EXAMPLE 7

For the establishment of an adhesive layer between a tab and an aluminum lid, a sheet adhesive (50μm) was prepared from a block polyesterimide (MA-PI/PEG/PTMG) with a melting point of 210° C. and a melt viscosity of 1400 Pa.s/260° C., by extrusion. From this sheet adhesive, parts of the same size as the bonding surface (approx. 50 mm$^2$) were stamped out. The stamped parts of the adhesive were placed onto the bonding surfaces. Pressing temperatures employed were 270° C. (bottom part) and 210° C. (upper part) and the contact pressure was 0.5 bar. The pressing contact time was between 2 and 3 seconds. Peeling strengths were 7.2 N/mm before sterilization and 4.7 N/mm after sterilization.

EXAMPLE 8

For the establishment of an adhesive layer between a cardboard tab and a container comprised of a composite laminate of paper and polyethylene, a hot melt adhesive with a melt viscosity of 80 Pa.s/200° C. and a softening point of 115° C. was chosen. The hot melt adhesive consisted of 70 parts by weight of a block copolyesteramide (PA-12/PEG) with a melt viscosity of 120 Pa.s/200° C., 15 parts by weight of an atactic graft polymer with a graft content of 1.5% by weight monostyrene and 3% by weight acrylic acid butylester, melting index (2.10 kg/190° C.): 8.0, and 15 parts by weight of a colophony resin ester, softening point 110° C. The adhesive bond prepared was heat treated at +75° C./30 minutes and subsequently the peeling strength determined:
Peeling strength before heat treatment: 3.8 N/mm
Peeling strength after heat treatment: 3.6 N/mm.

In both tests peeling fracture occurred in the paper substrate.

What is claimed is:

1. A packaging means adapted to be filled with a liquid or solid fill material having an opening in a wall thereof sealed by a removable sealing means, said sealing means being attached to said wall of said packaging means in a manner effective to seal said opening by means of a solvent-free thermoplastic hot melt adhesive, said solvent-free thermoplastic hot melt adhesive being comprised of at least one polymer of the general formula:

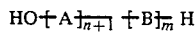

wherein A is selected from the group consisting of

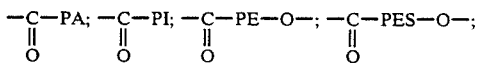

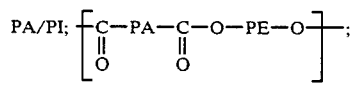

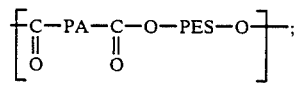

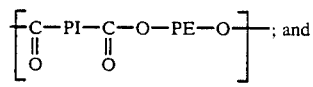

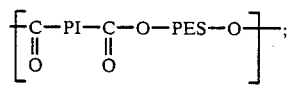

and wherein B is selected from the group consisting of PA, PI, PE, PES, a block segment of A, and only one of PA, PI, Pe or PES plus a block segment of, with the proviso that one of A or B contains segments of PA or PI while the other contains segments of PE or PES, n=an integer of 0 to 50, m=an integer of 0 to 50, the ratio of PA and/or PI to PE and/or PES in the block segments may range from 1:10 to 10:1 and the ratio A:B ranges from 1:20 to 20:1, wherein PA=polyamide/copolyamide, PA/PI=copolyamide imide, PI=polyimide, PE=polyether and PES=polyester/copolyester blocks.

2. The packaging means of claim 1 wherein said sealing means comprises a tear-off tab member.

3. The packaging means of claim 1 wherein said sealing means is comprised of the same material as the packaging means.

4. The packaging means of claim 1 wherein said packaging means is selected from the group consisting of cartons, boxes or cans.

5. The packaging means of claim 4 wherein said packaging means is comprised of a metal sheet or foil.

6. The packaging means of claim 4 wherein said packaging means is comprised of a material selected from the group consisting of a metal/plastic laminate and a metal/cellulose laminate.

7. The packaging means of claim 5 wherein said metal is selected from the group consisting of steel and aluminum.

8. The packaging means of claim 1 wherein said polymer comprises a block copolyetheramide consisting of 15 to 95 percent by weight of a polyamide and 5 to 85 percent by weight of a polyester produced by the polycondensation of a block copolyamide having reactive terminal groups and a bock copolyester having reactive terminal groups.

9. The packaging means of claim 1 wherein said polymer comprises a block copolyetherimide consisting of 15 to 95 percent by weight of a polyimide and 5 to 85 percent by weight of a polyester and is produced by the polycondensation of a block copolyimide having reactive terminal groups and a block copolyester having reactive terminal groups.

10. The packaging means of claim 1 wherein said adhesive additionally comprises a polymer or copolymer having a graft content of from 1 to 50 percent by weight.

11. The packaging means of claim 10 wherein said adhesive additionally comprises a polymer or copolymer having a graft content of from 1 to 25 percent by weight.

12. The packaging means of claim 1 wherein said adhesive contains a copolymer of a polyolefin and a vinyl ester.

13. The packaging means of claim 1 wherein said hot melt adhesive further includes an additive selected from the group consisting of adhesion-promoting compounds, colorants, fillers, pigments, antioxidants, heat stabilizers and mixtures thereof.

14. The packaging means of claim 13 wherein said adhesionpromoting compounds are selected from the group consisting of silanes and titanates.

* * * * *